Aug. 19, 1952  G. FEDERUK  2,607,837
BURGLAR ALARM FOR MOTOR VEHICLES
Filed June 30, 1950  2 SHEETS—SHEET 1
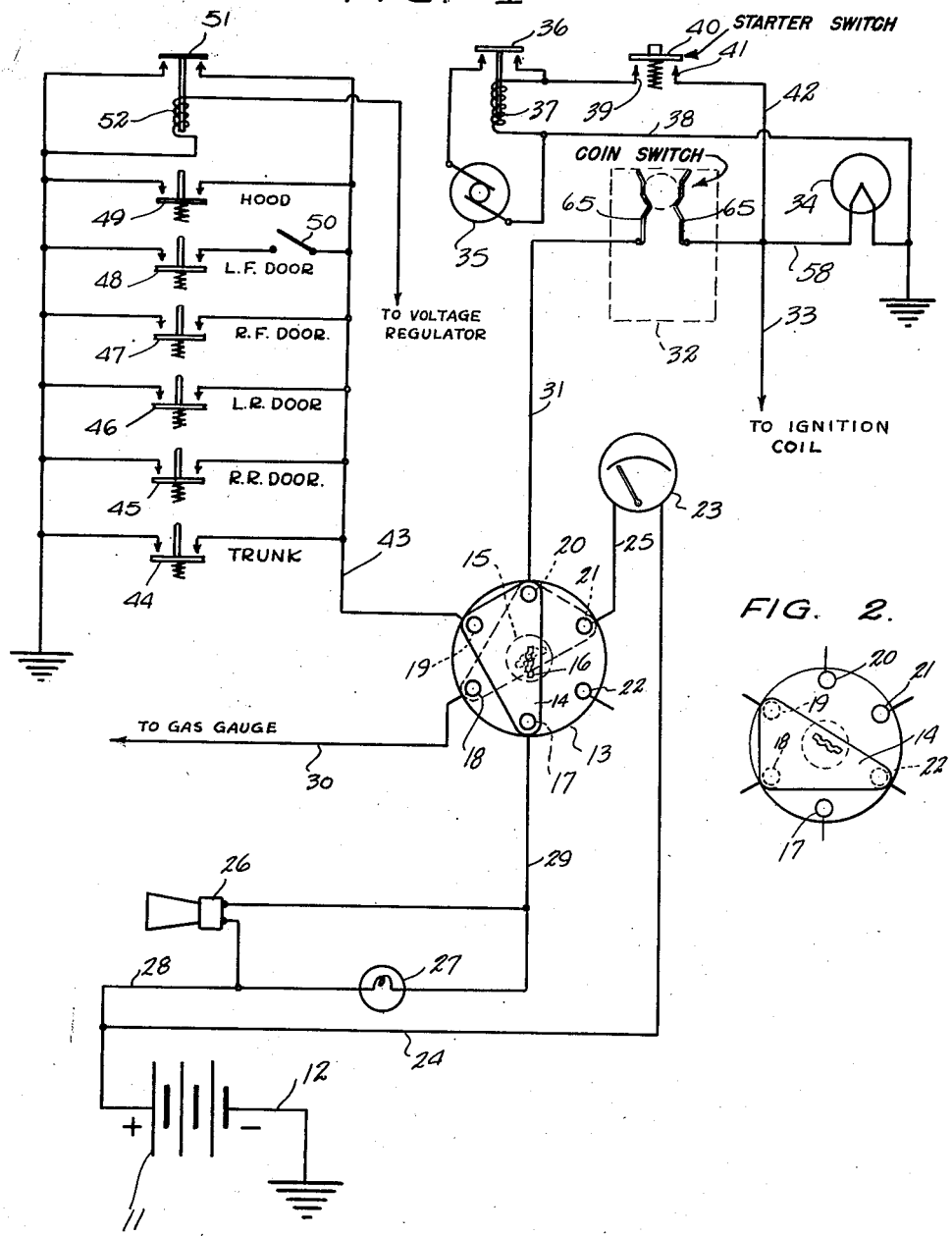
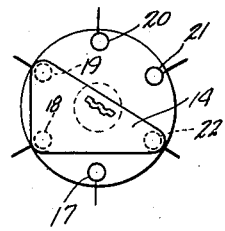
INVENTOR.
GEORGE FEDERUK,
BY
McMorrow, Berman & Davidson
ATTORNEYS.

Aug. 19, 1952           G. FEDERUK           2,607,837
BURGLAR ALARM FOR MOTOR VEHICLES
Filed June 30, 1950           2 SHEETS—SHEET 2
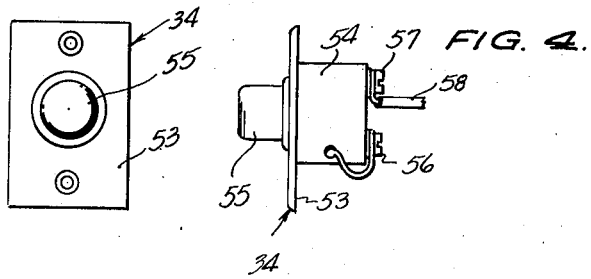
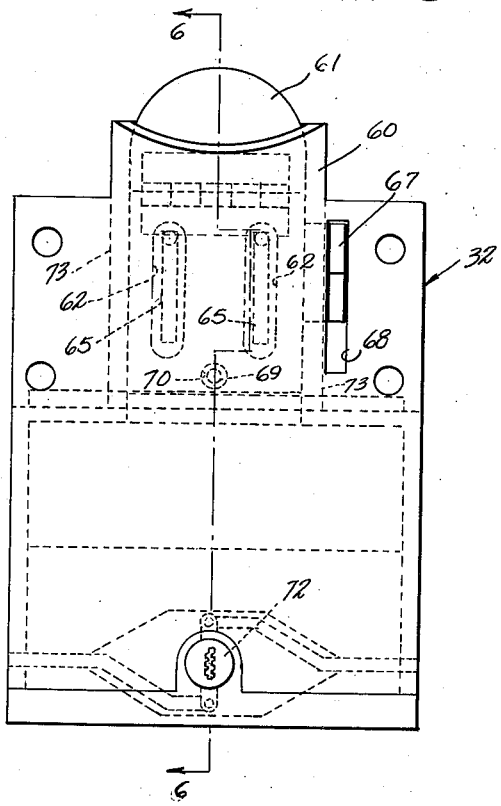
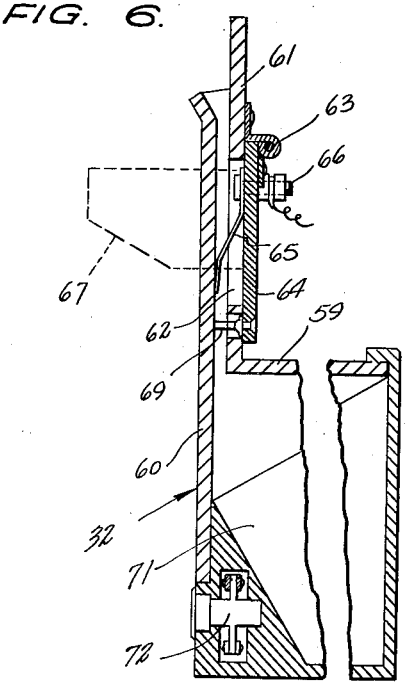
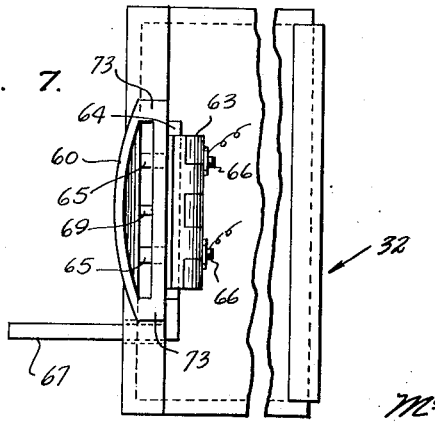
INVENTOR.
GEORGE FEDERUK,
BY
McMorrow, Berman + Davidson
ATTORNEYS.

Patented Aug. 19, 1952

2,607,837

UNITED STATES PATENT OFFICE 2,607,837

BURGLAR ALARM FOR MOTOR VEHICLES

George Federuk, Edmonton, Alberta, Canada

Application June 30, 1950, Serial No. 171,353

3 Claims. (Cl. 177—314)

1

This invention relates to burglar alarm devices for motor vehicles, and more particularly to an electrical burglar alarm system for automobiles.

A main object of the invention is to provide a novel and improved electrical burglar alarm system for automobiles which is simple in construction, which is easy to install, and which provides a visual and audible signal when any person attempts to open any of the doors of the automobile equipped with said alarm system, attempts to open the trunk or the hood of the automobile or attempts to drive the automobile.

A further object of the invention is to provide an improved burglar alarm system for an automobile, said system providing a visual and audible signal when any of the doors of the automobile are opened by an unauthorized person, when the automobile engine is started in an unauthorized manner, and which is associated with the key-operated ignition switch of the automobile in such a manner as to automatically set the alarm system for operation when the ignition is turned off.

Further objects and advantages of the invention will become apparent from the following description and claims, and from the accompanying drawings, wherein:

Figure 1 is a schematic wiring diagram of an improved burglar alarm system for motor vehicles constructed in accordance with the present invention;

Figure 2 is a schematic front elevational view of the ignition switch of the system of Figure 1 showing the ignition switch set in an inoperative position;

Figure 3 is a front elevational detail view of the warning signal lamp employed on the dashboard of the vehicle and forming part of the burglar alarm circuit of Figure 1;

Figure 4 is a side elevational detail view of the signal lamp of Figure 3;

Figure 5 is a front elevational detail view of the coin-operated switch forming part of the starting circuit of the automobile, as employed in Figure 1;

Figure 6 is a cross sectional view taken on line 6—6 of Figure 5; and,

Figure 7 is a top plan view of the coin-operated switch of Figure 5.

Referring to the drawing, and more particularly to Figure 1, 11 designates the battery of a motor vehicle, one terminal of the battery being grounded by a wire 12, as shown. Designated at 13 is a rotary switch provided with a rotary contact bar 14 which is provided with a suitable lock, shown at 15 in dotted view in Figure 1, said lock

2 being operated by a suitable key insertable in the keyhole 16. The switch 13 is provided with stationary contacts shown at 17 to 22, the contactor 14 being generally triangular in shape, as shown, and being arranged to simultaneously connect three out of four successive contacts of the switch in the manner shown in Figures 1 and 2. For example, as shown in Figure 1, the contactor 14 may be positioned to connect together the contacts 17, 19 and 20 while being free from engagement wtih the contact 18 and with the contacts 21 and 22. As further shown in dotted line view in Figure 1, the contactor 14 may be positioned so as to connect together the contacts 18, 20 and 21 while leaving the contacts 19, 22 and 17 disconnected. In a third position of the contactor 14, shown in Figure 2, the contacts 20, 21 and 17 may be left disconnected while the remaining contacts 18, 19 and 22 may be connected together.

Designated at 23 is a conventional ammeter connected between the positive terminal of the battery 11 and the stationary contact 21 by the respective wires 24 and 25, as shown. Designated at 26 and 27 respectively are an alarm horn and signal lamp connected in parallel between the positive terminal of the battery 11 and the contact 17 by the connecting wires 28 and 29. The contact 18 of the switch 13 is connected by a wire 30 to the electrical gasoline gauge of the motor vehicle. Contact 20 is connected by a wire 31 through a coin-operated switch, shown diagrammatically at 32, to a wire 33 connected to the ignition coil of the motor vehicle. Connected between wire 33 and ground is a signal lamp 34. Designated at 35 is the automobile starting motor which is arranged for operation in the usual manner by the closure of the starting switch 36. Starting switch 36 is operated by an electromagnet coil 37 having one terminal grounded by a wire 38 and having its other terminal connected to one of the contacts 39 of a push-button switch 40. The other contact 41 of the switch 40 is connected by a wire 42 to the ignition wire 33.

Contact 19 of the rotary, multiple-position switch 13 is connected to a wire 43. Connected between wire 43 and the ground are a plurality of normally open door-operated switches shown respectively at 44 to 49, the switch 44 being operated by the opening of the trunk door of the automobile, the switch 45 being operated by the opening of the right rear door of the automobile, the switch 46 being operated by the opening of the left rear door of the automobile, the switch 47 being operated by the opening of the right front door of the automobile, the switch 48 being operated by the opening of the left front door of the vehicle, and the switch 49 being operated by the opening of the hood cover of the automobile. Designated at 50 is a manually operated switch connected between the door-operated switch 48 and the wire 43, as shown, enabling the driver of the automobile to render the switch 48 inoperative at times by opening its circuit. Designated at 51 is an electro-magnetically operated switch connected between the wire 43 and ground, said electro-magnetically operated switch having an energizing coil 52 connected between ground and the generator output terminal of the voltage regulator of the automobile, whereby the switch 51 will be closed responsive to the starting of the automobile engine, by the voltage generated by the automobile generator.

From Figure 1 it will be seen that when the contactor 14 is placed in the position shown in full line view in Figure 1, the signal devices 27 and 26 will become energized when any one of the switches 44 to 49 or the switch 51 is closed, inasmuch as closure of any of said switches will connect wire 43 to ground. This grounds the wire 29, inasmuch as contact 19 is connected by the contactor 14 to contact 17, and therefore the energizing circuits for the signal devices 26 and 27 will be completed. Therefore, when the contactor 14 is placed in the position shown in full line view in Figure 1, and the switch 50 is closed, opening of any of the doors of the automobile or opening of the trunk door or hood of the automobile will cause the alarm devices 26 and 27 to become energized. Furthermore, under the conditions shown in full line view in Figure 1, if the automobile engine is started in any unauthorized manner, the switch 51 will be closed, thereby energizing the alarm devices 26 and 27.

It will be further noted that when the contactor 14 is in the dotted line position shown in Figure 1, the wire 43 is disconnected from the contactor 14, and similarly the contact 17 and the wire 29 are disconnected from said contactor. Therefore, under the conditions shown in dotted line view in Figure 1, the alarm devices 26 and 27 will be inoperative. Under said conditions, the wire 31 is connected to the positive terminal of the battery 11 through the contact 20, the contactor 14, the contact 21, the wire 25, the ammeter 23, and the wire 24. However, the ignition wire 33 will not be connected to the battery positive terminal unless the coin-operated switch 32 is closed by the insertion of a coin in its slot. If a proper coin is thus inserted, the ignition wire 33 will become connected to the positive terminal of the battery 11, as will the energizing circuit for the starter relay 37. When said coin is inserted into the slot of the switch 32, the signal lamp 34 becomes energized, since it is connected between the ignition coil wire 33 and ground. It will therefore become apparent that unless a coin is inserted in the coin-operated switch 32, the ignition coil remain de-energized and it will be impossible to energize the starting relay coil 37 of the starting motor 35. Therefore in order to start the automobile, it is necessary not only to turn the key-operated contactor 14 to the dotted line position shown in Figure 1 but also to insert a coin in the coin-operated switch 32.

Referring now to Figures 3 and 4, it will be seen that the signal lamp 34 may comprise a suitable base 53 secured to the vehicle dashboard and having mounted thereon a lamp socket 54 positioned rearwardly of the supporting plate 53. The plate 53 is apertured in the usual manner and is provided with a suitable transparent or translucent cover 55 which may be colored in any suitable manner such as colored green and which overlies the lamp bulb mounted in the socket 54. One terminal 56 of the socket 54 is grounded and the other terminal 57 is connected by a wire 58 to the ignition wire 33, as shown in Figure 1.

Referring now to Figures 5, 6 and 7, the coin-operated switch 32 comprises a housing 59 having a front wall 60 and formed at its upper portion with a rear wall element 61 positioned rearwardly of and parallel to the front wall 60 to define a coin passage between the wall 60 and 61. The rear wall element 61 is formed with a pair of parallel vertical slots 62, 62, and pivoted to the rear surface of the rear wall element 61 at a hinge designated at 63 is a flap member 64 of insulating material having secured thereto the forwardly offset resilient contact fingers 65, 65 which extend through the respective slots 62, 62. The fingers 65 are secured to the flap 64 by respective terminal bolts 66, one of which terminal bolts is connected to the wire 31 and the other of which is connected to the ignition wire 33, shown in Figure 1. The hinge 63 includes a conventional biasing spring which biases the flap 64 clockwise, as viewed in Figure 6, thereby maintaining the spring fingers 65, 65 in a position whereby said spring fingers engage the front wall element 60. Secured to the flap 64 is a forwardly projecting lug 67 which projects through a vertical slot 68 formed in the front wall element 60, said slot being sufficiently elongated to allow the lug 67 to be rotated downwardly, thereby rotating the flap 64 counter-clockwise, as viewed in Figure 6.

Normally the circuit between wires 31 and 33 is open at the spaced spring contact fingers 65, 65. When a coin is inserted between the front wall element 60 and the rear wall element 61, said coin descends and bridges the contacts 65, 65. The flap 64 is provided at its lower marginal portion with a forwardly projecting pin 69 which normally projects through an opening 70 formed in the lower portion of the rear wall element 61 and abuts the front wall element 60, thereby supporting the coin in bridging relation to the resilient fingers 65, 65. Under these conditions, the ignition wire 33 is connected to the wire 31 and the ignition coil, as well as the starter relay, may be energized, assuming the contactor 14 is in the dotted line position of Figure 1. The operator of the automobile may leave the coin in bridging relation to the contact fingers 65, 65 until he turns off the ignition by rotating the contactor 14 from the dotted line position of Figure 1 to the full line position thereof. This of course, prepares the burglar alarm circuits for operation. At the same time the vehicle operator may depress the lug 67, causing the coin to drop downwardly since it is disengaged from the pin 69 of flap 64, thereby opening the circuit between wires 31 and 33. The coin, when released, drops downwardly into the coin-collection compartment, shown at 71. Subsequently, in order to re-establish the energizing circuit for the ignition wire 33, it is necessary to insert another coin into the coin-operated switch.

The wires 31, 29, 24 and 25 may be suitably sheathed in metal tubing or the like so as to prevent unauthorized access to said wires.

The coin compartment 71 is provided with a suitable lock 72, whereby access to the coins deposited in the compartment is available only to the owner of the vehicle. The coins collected in the compartment 71 may be employed as a fund for any desired purpose, for example for purchasing license tags, required equipment for the automobile, and the like. The coin-operated switch 32 may be operated by a coin of any suitable denomination, the passage for receiving the coin being provided with side walls 73, 73 spaced apart by a sufficient distance to provide clearance for coins of most denominations.

While a specific embodiment of an improved burglar alarm system for automobiles has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a motor vehicle, a source of current, an ignition circuit, an alarm device, a door-operated switch, a rotary, key-operated multiple-position switch, first circuit means connecting said source of current to said ignition circuit through a first set of contacts of the multiple-position switch, and second circuit means connecting said source to said alarm device through said door-operated switch and a second set of contacts of said multiple-position switch, said door-operated switch having a manually operated switch in series therewith, said multiple-position switch being arranged to close said first set of contacts in one position thereof and to close said second set of contacts in another position thereof.

2. In a motor vehicle, a source of current, an ignition circuit, an engine starting circuit connected in parallel with said ignition circuit, an alarm device, a door-operated switch, a multiple-position switch, first circuit means connecting said source of current to said ignition circuit and said engine starting circuit through a first set of contacts of a multiple-position switch, a coin-operated switch in said first circuit means in series with said ignition circuit, and second circuit means connecting said source to said alarm device through said door-operated switch and a second set of contacts of said multiple-position switch, said multiple-position switch being arranged to close said first set of contacts in one position thereof and to close said second set of contacts in another position thereof.

3. In a motor vehicle, a source of current, an ignition circuit, an alarm device, a door-operated switch, a multiple-position switch comprising a first and a second set of contacts, said circuit means connecting said source of current to said ignition circuit through said first set of contacts of the multiple-position switch, and second circuit means connecting said source to said alarm device through said door-operated switch in series with said second set of contacts of said multiple-position switch, said multiple-position switch being arranged to close said first set of contacts in one position thereof and to close said second set of contacts in another position thereof.

GEORGE FEDERUK.

REFERENCES CITED

The following references are of record in the file of this patent:

UNITED STATES PATENTS

| Number | Name | Date |
|---|---|---|
| 492,478 | Sturts | Feb. 28, 1893 |
| 1,300,160 | Evans et al. | Apr. 8, 1919 |
| 1,396,667 | Simms | Nov. 8, 1921 |
| 1,720,230 | Murray | July 9, 1929 |
| 2,238,246 | Chapel | Apr. 15, 1941 |